United States Patent
Li (10) Patent No.: US 9,699,516 B2
(45) Date of Patent: Jul. 4, 2017

(54) SIGNAL AMPLIFIERS THAT SUPPORT MOCA COMMUNICATIONS AT BOTH ACTIVE AND PASSIVE OUTPUT PORTS

(71) Applicant: CommScope, Inc. of North Carolina, Hickory, NC (US)

(72) Inventor: Shi Man Li, Mooresville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 258 days.

(21) Appl. No.: 14/561,319

(22) Filed: Dec. 5, 2014

(65) Prior Publication Data

US 2015/0207525 A1 Jul. 23, 2015

Related U.S. Application Data

(60) Provisional application No. 61/929,593, filed on Jan. 21, 2014.

(51) Int. Cl.
*H04L 12/12* (2006.01)
*H04N 21/61* (2011.01)
*H04N 7/173* (2011.01)

(52) U.S. Cl.
CPC ..... *H04N 21/6118* (2013.01); *H04N 7/17309* (2013.01); *H04N 21/6168* (2013.01)

(58) Field of Classification Search
CPC .............. H04N 21/6118; H04N 7/17309
USPC ........................................ 370/297, 401, 389
See application file for complete search history.

(56) References Cited

U.S. PATENT DOCUMENTS

| | | |
|---|---|---|
| 5,016,244 A | 5/1991 | Massey, Jr. et al. |
| 5,696,895 A | 12/1997 | Hemphill et al. |
| 6,075,784 A | 6/2000 | Frankel et al. |
| 6,175,565 B1 | 1/2001 | McKinnon et al. |
| 6,202,169 B1 | 3/2001 | Razzaghe-Ashrafi et al. |
| 6,373,817 B1 | 4/2002 | Kung et al. |
| 6,477,197 B1 | 11/2002 | Unger |
| 6,640,239 B1 | 10/2003 | Gidwani |
| 6,671,253 B1 | 12/2003 | Alexander, Jr. et al. |
| 6,735,302 B1 | 5/2004 | Caine et al. |
| 6,785,907 B1 | 8/2004 | Dan et al. |

(Continued)

FOREIGN PATENT DOCUMENTS

| | | |
|---|---|---|
| JP | 2004-80483 | 3/2004 |
| JP | 2005-5875 | 1/2005 |

OTHER PUBLICATIONS

Signal Vision, Inc.; "Signal Vision 2-Way Subscriber Amplifier," specification sheet, 1 pg., Admitted Prior Art.

(Continued)

*Primary Examiner* — Dang Ton
(74) *Attorney, Agent, or Firm* — Muncy, Geissler, Olds & Lowe, P.C.

(57) ABSTRACT

RF signal amplifiers are provided that include an RF input port, a power divider network having a plurality of active output ports, an active path connecting the RF input port to the power divider network, the active path including an upstream diplexer, a downstream diplexer and a power amplifier between the upstream diplexer and the downstream diplexer, a passive output port, a MoCA diplexer that is coupled to the passive output port, a passive path connecting the RF input port to the MoCA diplexer and a MoCA rejection filter between the power divider network and the active path.

21 Claims, 5 Drawing Sheets

(56) References Cited

U.S. PATENT DOCUMENTS

| | | | |
|---|---|---|---|
| 6,839,829 | B1 | 1/2005 | Daruwalla et al. |
| 6,980,643 | B2 | 12/2005 | Chen et al. |
| 7,912,431 | B2 | 3/2011 | Phillips et al. |
| 7,974,586 | B2 | 7/2011 | Romerein et al. |
| 8,286,209 | B2 | 10/2012 | Egan, Jr. et al. |
| 8,356,322 | B2 | 1/2013 | Wells et al. |
| 8,429,695 | B2 | 4/2013 | Halik et al. |
| 8,510,782 | B2 | 8/2013 | Wells et al. |
| 2002/0101817 | A1 | 8/2002 | Teixeira |
| 2002/0101818 | A1 | 8/2002 | Teixeira |
| 2003/0066082 | A1 | 4/2003 | Kliger et al. |
| 2003/0214939 | A1 | 11/2003 | Eldumiati et al. |
| 2003/0223750 | A1 | 12/2003 | Farmer et al. |
| 2004/0027992 | A1 | 2/2004 | Volkening et al. |
| 2004/0170160 | A1 | 9/2004 | Li et al. |
| 2005/0014472 | A1 | 1/2005 | Cox et al. |
| 2005/0026571 | A1 | 2/2005 | Yang et al. |
| 2005/0068223 | A1 | 3/2005 | Vavik |
| 2005/0169056 | A1 | 8/2005 | Berkman et al. |
| 2006/0015921 | A1 | 1/2006 | Vaughan |
| 2006/0205442 | A1 | 9/2006 | Phillips |
| 2007/0165611 | A1 | 7/2007 | Yang et al. |
| 2008/0112392 | A1 | 5/2008 | Mansfield |
| 2010/0125877 | A1 | 5/2010 | Wells et al. |
| 2010/0146564 | A1 | 6/2010 | Halik et al. |
| 2010/0162340 | A1* | 6/2010 | Riggsby .................. H04N 7/102 725/127 |
| 2011/0283331 | A1 | 11/2011 | Riggsby |
| 2013/0343245 | A1 | 12/2013 | Li et al. |

OTHER PUBLICATIONS

Electroline: "Drop Amplifiers"; information from website www.electroline.com; 13 pgs. (Apr. 26, 2005), Admitted Prior Art.
Antronix; "Amplifiers: Residential Amplifiers"; information from website www.antronix.net; 2 pgs. (Apr. 26, 2005) Admitted Prior Art.
Andes, Inc.'"Amplifiers"; information from website; 10 pgs. (Apr. 26, 2005), Admitted Prior Art.
Extreme Broadband Engineering; "Subscriber Broadband Amplifiers"; 6 pgs. (Apr. 26, 2005), Admitted Prior Art.
Antronix; "Amplifiers: Residential Amplifiers"; information from website www.antronix.net; 2 pgs. (Mar. 19, 2008), Admitted Prior Art.
Extreme Broadband Engineering; "Infinity Premise System"; information from website www.extreme-broadband.com 5 pgs. (Mar. 19, 2008), Admitted Prior Art.
Andes, Inc. "Amplifiers" information from website; 13 pgs. (Mar. 19, 2008), Admitted Prior Art.
Electroline: "Drop Amplifiers"; information from website www.electroline.com; 8 pgs. (Mar. 19, 2008), Admitted Prior Art.
U.S. Appl. No. 11/182,738.
Antronix Product Overview: ARA4-7B1/AC Advanced Residential Amplifier Bypass Port, www.antronix.net, Jul. 2005.
Bypass Drop Amplifier, PCT International, Product Specifications, info@pctintl.com.
"Clipcomm CP-100P," VOIPSupply.com; http://www.voipsupply.com/product_info.php?products_id=305, 2 pages printed from Internet Jun. 6, 2005.
"VOIP/PSTN 2-Line Intelligent Switch (Gateway/Phone/ATA)," eBay.com http://cgi.ebay.com/ws/eBayISAPI.dllZViewItem&item=5193203853&category=11188, 7 pages printed from Internet on Jun. 6, 2005.
"Epygi Quadro 16x #16209," The VOIPConnection.com http://www.thevoipconnection.com/store/customer/product.php?productid=16209&cat=255&page=1, 2 pages printed from Internet on Jun. 6, 2005.
Zepnick, John, "TWC Drop Amplifier Qualification Plan—TWC Mocha/DSG Enhanced Product," Product Brochure, Version 2.0, Apr. 28, 2011, 16 pages.
MoCA Bypass Amplifiers (PCTVCF-15P, PCTVCF-19P, PCTVCF-19A) Brochure, PCT International, 2011.

* cited by examiner

SIGNAL AMPLIFIERS THAT SUPPORT MOCA COMMUNICATIONS AT BOTH ACTIVE AND PASSIVE OUTPUT PORTS

CROSS-REFERENCE TO RELATED APPLICATION

The present application claims priority under 35 U.S.C. §119 to U.S. Provisional Patent Application Ser. No. 61/929,593, filed Jan. 21, 2014, the entire contents of which is incorporated herein by reference as if set forth in its entirety.

FIELD OF THE INVENTION

The present invention generally relates to radio frequency ("RF") signal amplifiers and, more particularly, to signal amplifiers that support Multimedia Over Coax Alliance ("MoCA") communications.

BACKGROUND

The rise of the Internet has rapidly transformed the manner in which electronic communications take place. Today, prior-generation switched telephone communications arrangements are rapidly being replaced with Internet Protocol (IP) based communications networks. IP communications networks can provide flexibility in facilitating the transmission of voice, data, video, and other information at great speeds.

In many cases, the IP communications networks comprise cable television networks that are used to transmit information between a service provider and a plurality of subscriber premises, typically Over fiber optic and/or coaxial cables. The service provider may offer, among other things, cable television, broadband Internet and Voice-over-Internet Protocol ("VoIP") digital telephone service to subscribers within a particular geographic area. The service provider transmits "forward path" or "downstream" signals from the headend facilities of the cable television network to the subscriber premises and "reverse path" or "upstream" signals may also be transmitted from the individual subscriber premises back to the headend facilities. In the United States, the forward path signals are typically transmitted in the 54-1002 MHz frequency band, and may include, for example, different tiers of cable television channels, movies on demand, digital telephone and/or Internet service, and other broadcast or point-to-point offerings. The reverse path signals are typically transmitted in the 5-42 MHz frequency band and may include, for example, signals associated with digital telephone and/or Internet service and ordering commands (i.e., for movies-on-demand and other services).

Significant attenuation may occur as signals are passed through the cable television network, and hence the power level of the forward path RF signals that are received at the subscriber premises may be on the order of 0-5 dBmV/channel. Such received signal levels may be insufficient to support the various services at an acceptable quality of service level. Accordingly, RF signal amplifiers may be provided at or near individual subscriber premises that are used to amplify the forward path RF signals to a more useful level. These RF signal amplifiers may also be configured to amplify the reverse path RF signals that are transmitted from the subscriber premises to the headend facilities of the cable television network. Typically, each signal amplifier will include a power divider network that divides the forward path signal and distributes it to multiple RF output ports, each of which may be connected to a respective one of a plurality of wall outlets throughout the subscriber premises. The power divider network may also combine any reverse path signals received from the wall outlets for transmission back to the headend facilities.

Unfortunately, RF signal amplifiers are active devices that require electrical power for proper operation. Accordingly, if electrical power to an RF signal amplifier is interrupted, some or all of the communications between the service provider and the subscriber premises may be lost. Although such interruptions may be tolerated in relation to certain non-essential services, interruptions to other services may be unacceptable. For example, subscribers relying on IP-based emergency communications (i.e., 911 service) can be left without such services during power interruptions. Interruption of 911 service is generally considered to be unacceptable. In order to remedy this problem, various signal amplifiers have been proposed that have both an active (amplified) communications path and a separate passive communications path. The VoIP telephone service may be provided over the passive communications path which will ensure that 911 telephone service will be supported even during power outages.

Another recent trend is to use the coaxial cables that are installed throughout most homes, apartments and other subscriber premises as a network that may be used to transmit signals from a device that is connected to a first wall outlet in a premises to other wall outlets. An industry alliance known as the Multi-media Over Coax Alliance ("MoCA") has developed standards which specify frequency bands, interfaces and other parameters that will allow equipment from different standards-compliant vendors to be used to distribute multi-media content over in-premises coaxial cable networks. These standards specify that such "MoCA" content is transmitted over the in-premises coaxial cable networks in the 850 MHz to 1675 MHz frequency band, although many service providers only distribute MoCA content within a narrower frequency band that is above the cable television band, such as, for example, the 1150 MHz to 1550 MHz frequency band. Examples of MoCA content that may be distributed over an in-premises coaxial cable network are digital television, video-on-demand programming and digitally-recorded television or music programming. In an exemplary application, such programming may be transmitted via the coaxial cables that run through the walls of a home from a primary set-top box (which may be a full service set top box having a digital television receiver, DVR and/or video-on-demand capabilities, etc.) to less capable, less expensive auxiliary set-top boxes that are installed on other televisions throughout the premises. In this manner, the full capabilities of the primary set top box may be enjoyed at all of the televisions within the residence without having to provide a primary set top box for each television.

A number of MoCA-enabled signal amplifiers have been proposed. Examples of these signal amplifiers are disclosed in U.S. Pat. No. 8,397,271, U.S. Pat. No. 8,286,209, U.S. Patent Publication No. 2010/0125877, U.S. Patent Publication No. 2010/0146564 and U.S. Pat. No. 8,356,322.

SUMMARY

Pursuant to embodiments of the present invention, RF signal amplifiers are provided that include an RF input port, a power divider network having a plurality of active RF output ports, an active communications path connecting the RF input port to the power divider network, the active communications path including an upstream diplexer, a downstream diplexer and a power amplifier between the upstream diplexer and the downstream diplexer, a passive RF output port, a passive path diplexer that is coupled to the passive RF output port, wherein the passive path diplexer routes signals in a service provider network frequency band differently than signals in a second network frequency band, the service provider network frequency band being different than the second network frequency band, a passive communications path connecting the RF input port to the passive path diplexer, and a MoCA rejection filter between the power divider network and the active communications path.

In some embodiments, the passive path diplexer may be a MoCA diplexer, and the amplifier may further include an electrical connection between a high frequency port of the MoCA diplexer and a node between the MoCA rejection filter and the power divider network. This electrical connection may provide a communications path that allows MoCA signals to be transmitted from the active RF output ports to the passive RF output port. A common port of the MoCA diplexer may be coupled to the passive RF output port, and a low frequency port of the MoCA diplexer may be coupled to the passive communications path. The MoCA rejection filter may be a first integrated circuit MoCA rejection filter, and the MoCA diplexer may be a second integrated circuit MoCA rejection filter combined with a third integrated circuit filter that blocks signals in the 5 MHz to 1002 MHz frequency band (e.g., at least in the 1150 MHz to 1675 MHz frequency band).

In some embodiments, the RF signal amplifier may further include a power input for receiving electrical power, and the active communications path may include a selective termination circuit that is configured to pass signals between the RF input port and the upstream diplexer when electrical power is received at the power input, and that is further configured to terminate the active communications path to a matched termination when an electrical power feed to the power input is interrupted. In such embodiments, the selective termination circuit may comprise a relay having an input terminal, a first output terminal and a second output terminal, and the first output terminal of the relay may be coupled to the upstream diplexer and the second output terminal of the relay may be connected to a resistor that is terminated to a ground voltage. The RF signal amplifier may also include a directional coupler having an input that is connected to the RF input port, a first output that is connected to the input terminal of the relay and a second output that is connected to the passive communications path. In other embodiments, the selective termination circuit may be a switching device having an input terminal that is coupled to the RF input, a first output terminal that is coupled to the upstream diplexer, and a second output terminal that is connected to an input of an attenuator. In such embodiments, an output of the attenuator may be coupled to the upstream diplexer.

In some embodiments, the power divider network may include at least a first directional coupler that has an input port, first and second output ports and a MoCA bypass circuit coupled between the first and second output ports that is configured to pass signals in the 1150 MHz to 1675 MHz frequency band, and an isolation circuit that is provided between the first and second output ports of the first directional coupler that is configured to block signals in the 5 MHz to 1002 MHz frequency band. The MoCA rejection filter may be configured to reflect a majority of the signal energy in the 1150 MHz to 1675 MHz frequency band. The RF signal amplifier of Claim 1, further comprising a printed circuit board, wherein the MoCA rejection filter comprises an integrated circuit chip that is pre-tuned to reject signals in the 1150 MHz to 1675 MHz frequency band, the integrated circuit chip surface mounted on the printed circuit board.

Pursuant to additional embodiments of the present invention, RF signal amplifiers are provided that include an RF input port, a power divider network having a plurality of active RF output ports, an active communications path connecting the RF input port to the power divider network, the active communications path including an upstream diplexer, downstream diplexer and a power amplifier between the upstream diplexer and the downstream diplexer, a first MoCA rejection filter between the power divider network and the active communications path, a passive RF output port, a passive communications path connecting the RF input port to the passive RF output port, a second low pass filter on the passive communications path between the RF input port and a first node that is connected to the passive RF output port, the second low pass filter configured to pass signals in upstream and downstream frequency bands of a service provider, and a third filter coupled between a second node that is between the first MoCA rejection and the power divider network and the first node, the third filter configured to pass signals in a MoCA frequency band and to not pass signals in the upstream and downstream frequency bands of the service provider.

Pursuant to still further embodiments of the present invention, RF signal amplifiers are provided that include an RF input port, a power divider network having a plurality of active RF output ports, an active communications path connecting the RF input port to the power divider network, the active communications path including an upstream diplexer, a downstream diplexer and a power amplifier between the upstream diplexer and the downstream diplexer, a passive RF output port, a passive communications path connecting the RF input port to the passive RF output port, a first MoCA rejection filter between the power divider network and the active communications path, a second low pass filter along the passive communications path between the RF input port and a first node that is connected to the passive RF output port, the second low pass filter configured to pass signals in upstream and downstream frequency bands of a service provider, an electrical connection between the first node and a second node that is between the first MoCA rejection filter and the power divider network, the electrical connection providing a communications path allowing MoCA signals to be transmitted from the active RF output ports to the passive RF output port, a third filter along the electrical connection between the first node and the second node, the third filter configured to pass signals in a MoCA frequency band and to not pass signals in the upstream and downstream frequency bands of the service provider; and a power input for receiving electrical power. In these embodiments, the active communications path includes a selective termination circuit between the RF input port and the upstream diplexer, the selective termination circuit being configured to pass signals between the RF input port and the upstream diplexer when electrical power is received at the power input, and that is configured to terminate the active communications path to a matched termination when an electrical power feed to the power input is interrupted.

In some embodiments, the first MoCA rejection filter may be configured to reflect a majority of the signal energy in the 1150 MHz to 1675 MHz frequency band. The third filter may be a bandpass filter or a high pass filter. The selective termination circuit may be a relay having an input terminal, a first output terminal and a second output terminal, and the first output terminal of the relay may be coupled to the upstream diplexer and the second output terminal of the relay may be connected to a resistor that is terminated to a ground voltage, the RF signal amplifier further comprising a directional coupler having an input that is connected to the RF input port, a first output that is connected to the input terminal of the relay and a second output that is connected to the passive communications path.

In some embodiments, the selective termination circuit may be a switching device having an input terminal that is coupled to the RF input, a first output terminal that is coupled to the upstream diplexer, and a second output terminal that is connected to an input of an attenuator. An output of the attenuator may be coupled to the upstream diplexer.

In some embodiments, the power divider network may be at least a first directional coupler that has an input port, first and second output ports and a MoCA bypass circuit coupled between the first and second output ports that is configured to pass signals in the 1150 MHz to 1675 MHz frequency band, and an isolation circuit that is provided between the first and second output ports of the directional coupler that is configured to block signals in the 5 MHz to 1002 MHz frequency band. The amplifier may include a printed circuit board, and the first MoCA rejection filter may be an integrated circuit chip that is pre-tuned to reject signals in the MoCA frequency band, the integrated circuit chip surface mounted on the printed circuit board.

DETAILED DESCRIPTION

Pursuant to embodiments of the present invention, RF signal amplifiers are provided that support MoCA communications. The RF signal amplifiers according to embodiments of the invention include both an active communications path that connects to a plurality of active RF output ports and a passive, non-amplified communications path that connects to a passive RF output port. The passive communications path may be provided to ensure that communications such as 911 emergency telephone service to a VoIP telephone may be supported during power outages. The RF signal amplifier may be configured so that MoCA communications may be transmitted between any of the RF output ports, including the passive RF output port.

The RF signal amplifiers according to embodiments of the present invention may include a MoCA rejection filter that is positioned between the active RF output ports and the active communications path. The RF signal amplifiers may further include a passive path diplexer that is coupled to the passive output port or, alternatively, first and second filters. A power divider network may be provided between the active communications path and the active RF output ports. A MoCA communications path is provided that connects a node that is between the MoCA rejection filter and the power divider network to a high frequency port of the passive path diplexer or to a filter that connects to the passive path. The passive path diplexer, if provided, may comprise a MoCA diplexer that is designed to selectively route signals in a service provider network frequency band between a first input port and a common port of the diplexer and signals in a MoCA network frequency band between a second input port and a common port of the diplexer.

The power divider network may comprise a layered series of directional couplers that divide the forward path signals and distribute them to the active RF output ports, and that combine the reverse path signals and deliver the combined signal to the active communications path. One or more of the directional couplers in the power divider network may include a MoCA bypass circuit. The MoCA bypass circuits may provide low-loss bypass paths through the power divider network that can be used to transmit MoCA signals while maintaining a high degree of signal isolation in the cable television network frequency band between the outputs of each directional coupler in the power divider network.

The MoCA rejection filter may be designed to reflect a substantial amount of the signal energy in the MoCA frequency band that is transmitted through the power divider network in the reverse path direction or through the passive RF output port so that the signal energy is redirected to the forward direction toward the active and passive RF output ports. In some embodiments, the MoCA rejection filter will reflect at least fifty percent of the signal energy in the 1150 MHz to 1675 MHz range. By reflecting a significant portion of the signal energy in the MoCA frequency band as opposed to simply attenuating such signal energy, the MoCA rejection filter may facilitate transmitting MoCA signals between the active and passive RF output ports that exhibit higher signal-to-noise ratios, and hence higher quality signals.

The MoCA diplexer may comprise a three port device that includes a high frequency port that is coupled to a node that is between the MoCA rejection filter and the input to the power divider network, a low frequency port that is coupled to the passive communications path, and a common port that is coupled to the passive RF output port. Forward and reverse path signals in the frequency band of the service provider network (e.g., signals in the 5 MHz to 1002 MHz frequency band) may be passed between the passive communications path and the passive RF output port through the low frequency and common ports of the MoCA diplexer, but cannot pass through the high frequency port of the MoCA diplexer towards the active communications path and the power divider network. High frequency MoCA band signals (e.g., signals in the 1150 MHz to 1675 MHz frequency band) may be passed between the active RF output ports and the passive RF output port through the high frequency and common ports of the MoCA diplexer, but cannot pass through the low frequency port of the MoCA diplexer towards the passive communications path. In some embodiments, the MoCA diplexer may be replaced with a pair of filters, one of which passes signals in the MoCA frequency band and the other of which passes signals in the cable television frequency band.

RF signal amplifiers according to embodiments of the present invention will now be discussed in more detail with reference to the attached drawings, in which example embodiments of these RF signal amplifiers are shown. The RF signal amplifiers according to embodiments of the present invention may provide improved performance and reliability at subscriber premises that have both VoIP telephone service and an in-premises MoCA network.

Figure 1:
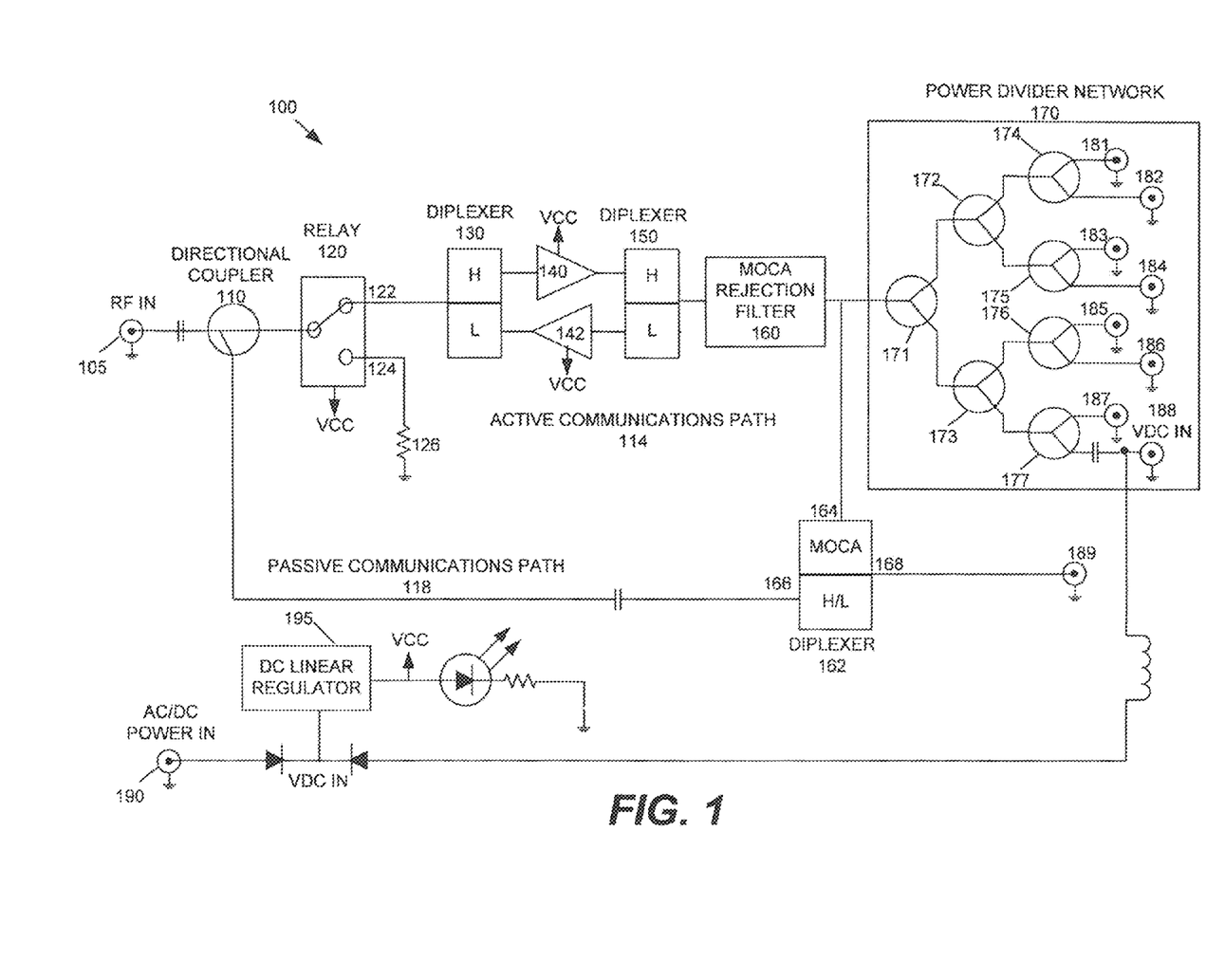
FIG. 1 is a block diagram of a bi-directional RF signal amplifier for a cable television network that is capable of supporting MoCA communications according to embodiments of the present invention.

FIG. 1 is a block diagram of a bi-directional RF signal amplifier 100 that may be used at a subscriber premises which is provided with MoCA capabilities. RF signal amplifier 100 includes a bi-directional RF input port 105 and a plurality of bi-directional RF output ports 181-189. The RF input port 105 is configured to receive a composite forward path RF signal from a service provider, or any other appropriate signal source. In a typical residential application, the composite forward path signal received at RF input port 105 may be within the frequency range of approximately 54-1002 MHz, may have a voltage of approximately 5dBmV/channel, and may include, for example, digital telephone, cable television and/or broadband Internet signals. The RF signal amplifier 100 may increase the composite forward path signal to a more useful level of approximately 20 dBmV/channel and pass the amplified forward path signal to one or more end devices in the subscriber premises (not shown in FIG. 1) through the RF output ports 181-189. These end devices may include, for example, televisions, modems, telephones, and/or other communications devices known in the art.

The RF output ports 181-189 receive signals from the end devices and combine these signals into a composite reverse path signal using a power divider network 170. The composite reverse path signal is passed to the RF input port 105 where it is passed via the service provider network to the service provider. Due to the bi-directional nature of the above-described communications through RF signal amplifier 100, it will be appreciated that an "input" port will act as an "output" port and an "output" port will act as an "input" port if the direction of signal flow is reversed. Consequently, it will be appreciated that the terms "input" and "output" are used herein solely for purposes of distinguishing various ports from one another, and are not used to require a direction of signal flow.

Signals received through input port 105 are passed to a passive directional coupler 110 that has a first output port that connects to a first "active" communications path 114 and a second output port that connects to a second "passive" communications path 118. The directional coupler 110 splits forward path RF signals onto the active communications path 114 and the passive communications path 118. It will be appreciated that the directional coupler 110 (as well as the other directional couplers described herein) may either evenly or unevenly split the power of the forward path signals between the active and passive communications paths 114, 118, depending on the design of the overall circuit. As discussed in more detail below, the active communications path 114 may include a power amplifier that amplifies the forward path signals and/or a power amplifier that amplifies reverse path signals. The passive communications path 118, in contrast, does not include any active components and hence is "non-interruptible" in the sense that forward and reverse path communications may be maintained over the passive communications path 118 even if a power feed to the RF signal amplifier 100 is interrupted. Typically, the passive communications path 118 is used to support VoIP telephone service so that emergency services such as 911 service will operate even during power outages at the subscriber premises (assuming that the modem and/or telephone, as necessary, are powered by a battery backup unit).

As is further shown in FIG. 1, forward path signals that are passed from directional coupler 110 onto the active communications path 114 are received at the input port of a switching device such as for example, an SPDT non-latching relay 120. A first output 122 of the relay 120 is connected to an input of a high/low diplexer 130. A second output 124 of the relay 120 is connected to a matched termination 126 in the form of a 75 ohm resistor that is connected in series to ground. The design and operation of the relay 120 and the matched termination 126 will be discussed in further detail herein.

The high/low diplexer 130 separates the forward path signals from any reverse path signals that are incident in the reverse direction. In various embodiments, diplexer 130 can filter the signals in a manner such that signals with frequencies greater than approximately 45-50MHz are passed as "high frequency" forward path signals, while signals with frequencies lower than such range are passed in the reverse direction as "low frequency" reverse path signals received from ports 181-188. It will be appreciated, however, that other diplexer designs may be utilized.

The forward path signals filtered by diplexer 130 can be amplified by power amplifier 140, and passed through a second high/low diplexer 150 to a MoCA rejection filter 160. The second high/low diplexer 150 may be identical to the first high/low diplexer 130. The first diplexer 130 may be referred to herein as the "upstream" diplexer since it is located on the active communications path 114 closer to the RF input port 105 than the second diplexer 150. The second diplexer 150 may be referred to herein as the "downstream" diplexer on the active communications path 114.

The MoCA rejection filter 160 may comprise a filter that passes signals in the range of frequencies supported by the service provider. For example, if the service provider comprises a cable television operator in the United States, the MoCA rejection filter 160 may pass signals at least in the frequency band of about 5 MHz to about 1002 MHz. The MoCA rejection filter 160 may substantially block signals in the frequency range of the in-premises network. For example, if the in-premises network comprises a MoCA network that is designed to operate in the 1150 MHz to 1675 MHz frequency range, the MoCA rejection filter 160 may be configured to block signals in at least the 1150 MHz to 1675 MHz frequency band. In many instances, the MoCA rejection filter 160 may be implemented as a low pass filter that substantially blocks signals at frequencies above a selected cut-off frequency that is above the uppermost frequency used by the service provider network.

The forward path signals pass from the MoCA rejection filter 160 to a power divider network 170. The power divider network 170 may split the composite forward path signal that traverses the active communications path 114 so that it may be distributed to each of RF output ports 181-188. As shown in FIG. 1, the power divider network 170 comprises seven directional couplers 171-177 that are cascaded to split the signal energy eight ways for delivery to the eight RF output ports 181-188. While the power divider network 170 illustrated in FIG. 1 splits the forward path signals along the active communications path 114 eight ways, it will be appreciated that the power divider network 170 may split the forward path signals for distribution to different numbers of RF output ports (e.g., 4, 16, etc.).

As noted above, the directional coupler 110 splits the composite forward path signal received at RF input port 105 onto either the above-described active communications path 114 or onto a passive communications path 118. The forward path signal energy that is split onto the passive communications path 118 is fed to the low frequency port 166 of a passive path diplexer 162. The passive path diplexer 162 may comprise, for example, a MoCA diplexer 162 that is designed, for example, to pass signals in the 5 MHz to 1002 MHz frequency band between the low frequency port 166 and a common port 168 and to pass signals in the 1150 MHz to 1675 MHz frequency band (or another high frequency band) between the high frequency port 164 and the common port 168. Signals in the 1150 MHz to 1675 MHz frequency band will be blocked from passing in the reverse direction through the low frequency port 166, while signals in the 5 MHz to 1002 MHz frequency band will be blocked from passing in the reverse direction through the high frequency port 164. It can readily be seen from FIG. 1 that forward and reverse path signals may be passed between the RF input port 105 and the passive RF output port 189 via the passive communications path 118. As there are no active components along this passive communications path 118, communications may flow along the path even if an electrical power feed to the RF signal amplifier 100 is interrupted.

Note that herein the term "MoCA diplexer" is used broadly to refer to a diplexer that selectively routes signals in a service provider network frequency band between a first input port and a common port of the diplexer and signals in an in-premises network frequency band between a second input port and a common port of the diplexer, where the in-premises network is within the MoCA frequency band.

Turning now to the reverse path signal flow along the active communications path 114, reverse path signals received by the RF signal amplifier 100 from end devices that are in communication with RF ports 181-188 are passed to the power divider network 170 where they are combined into a composite reverse path signal. This composite reverse path signal is fed to the MoCA rejection filter 160 or to the MoCA diplexer 162. In particular, any reverse path signals in the 5 MHz to 1002 MHz range will pass to the MoCA rejection filter 160, while signals in the 1150 MHz to 1675 MHz range will pass to the MoCA diplexer 162. As the reverse path signals from active RF output ports 181-188 that pass through the MoCA rejection filter 160 will be in the 5 MHz to 42 MHz frequency band, when they enter the common port of downstream diplexer 150 they are routed through the low frequency port of diplexer 150 to a power amplifier 142, which amplifies the signal to a more useable level. The amplified signal is passed to the low frequency port of the upstream diplexer 130, where it is then passed through the input port of diplexer 130 to the first output port 122 of the non-latching SPDT relay 120. The reverse path signals pass from the relay 120 to the first output port of the directional coupler 110. The directional coupler 110 combines the upstream signal received at the first output port with any reverse path signals received at the second output port and passes this combined signal to the RF input port 105 for output to a service provider or other entity.

The power amplifiers 140, 142 that are included along the active communications path 114 are active devices that must be powered via a power source such as a DC linear regulator that outputs a power supply voltage VCC. During normal operation, the RF signal amplifier 100 can be powered from a power input port 190 and/or power that is reverse fed through one of the RF output ports (e.g., RF output port 188). As illustrated in FIG. 1, the power received from either power input 190 or power input 188 may be provided to a voltage regulator 195 which supplies an operating voltage VCC to the power amplifiers 140, 142.

In the event that power to voltage regulator 195 is interrupted, voltage regulator 195 will be unable to provide operating voltage VCC to power amplifiers 140, 142. As a result, power amplifiers 140, 142 will not function to amplify the signals on the active communications path 114, and will typically appear as an undefined impedance circuit. Consequently, during power outages, the active communications path 114 will cease to operate.

As noted above, RF signal amplifier 100 also has a passive communications path 118 that extends from the second output of the directional coupler 110 to the passive RF output port 189. This passive communication path 118 does not include any active components and, consequently, will remain available to pass communications between RF input port 105 and RF output port 189 even when the power supply to RF signal amplifier 100 is interrupted.

As is apparent from the above discussion, the directional coupler 110 is used to split forward path signals received through RF input port 110 into two separate components, and delivers the first component of the split signal to RF output ports 180-188 via the active communications path 114 and delivers the second component of the split signal to RF output port 189 via the passive communications path 118. The directional coupler 110 likewise combines any reverse path signals that are received over the active and passive communications paths 114, 118 and provides this combined reverse path signal to the RF input port 105.

Unfortunately, when the power supply to RF signal amplifier 100 is interrupted, the power amplifiers 140, 142 may appear as an undefined impedance circuit along the active communications path 114. When this occurs, the functional impedance at the first output of the directional coupler 110 may be difficult to predict, and will likely differ greatly from 75 ohms, which is the line impedance that coaxial cable networks are typically designed to exhibit. As a result, if the non-latching relay 120 remains set in its "through" position that is shown in FIG. 1 (which connects the input of relay 120 to output 122), the impedances of the two outputs of the directional coupler 110 will typically not be matched during power interruptions (since the "passive" output may have an impedance of approximately 75 ohms, whereas the "active" output will typically have an impedance that differs significantly from 75 ohms due to the unknown impedance exhibited by the non-powered power amplifiers 140, 142). Such an impedance mismatch may give rise to signal reflections and other distortions that may significantly degrade any RF signals traversing the passive communications path 118. These signal degradations may result in poor or even lost service on the passive communications path 118.

The relay 120 is included in RF signal amplifier 100 to improve the impedance match between the outputs of the directional coupler 110 during power outages. In particular, as is shown in FIG. 1, the power supply voltage VCC is supplied to the relay 120. So long as the power supply voltage VCC is received at the relay 120, the relay 120 is maintained in its "through" position (i.e., the position illustrated in FIG. 1). In this position, forward path RF signals are passed from the input of the relay 120 to the first output 122 where they are fed directly to the upstream diplexer 130. However, when power (i.e., VCC) is interrupted, the relay 120 switches from the normal signal path in the "through" position, to the "terminated" position such that the input to the relay 120 is connected to the second output 124. As noted above, the second output 124 of relay 120 is connected to a matched termination 126 in the form of a 75 ohm resistor that is connected in series to ground. This matched termination 126 will exhibit a line impedance of approximately 75 ohms at the "active" output port of directional coupler 110, thereby matching the line impedance on the "passive" output port, which may significantly reduce signal reflections. When the power supply to RF signal amplifier 100 is interrupted, the relay 120 senses the interruption and automatically switches from the "through" position to the "terminated" position. As such, signal degradation due to reflections and the like can be reduced or minimized in order to provide acceptable signal quality on the passive communications path 118 during power outages.

The RF signal amplifier may also support MoCA communications that are passed from one of the RF output ports 181-189 to other of the RF output ports. Notably, MoCA communications are not only supported between the active RF output ports 181-188, but are also supported between the active RF output ports 180-188 and the passive RF output port 189.

In some embodiments, the MoCA rejection filter 160 may be implemented as an integrated circuit chip that has one or more filters that are pre-tuned to reject signals in the MoCA frequency band. The RF signal amplifier 100 may include a housing and the MoCA rejection filter 160 may be mounted on a printed circuit board that is disposed within the housing. The MoCA diplexer 162 may also be integrated as one or more integrated circuit chips that are pre-tuned to reject and pass various frequency bands.

Figure 2:
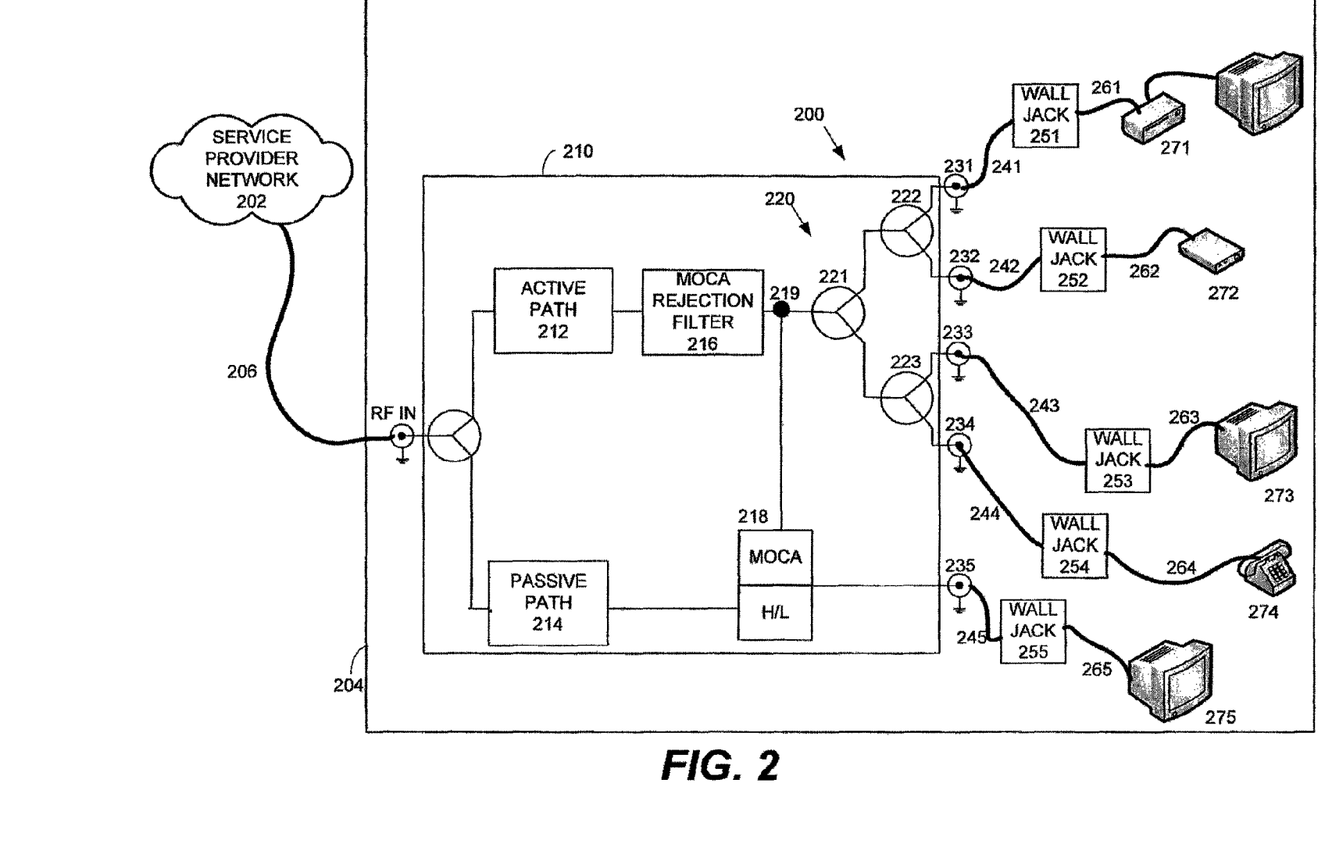
FIG. 2 is a schematic diagram illustrating an in-premises MoCA network that is implemented using a signal amplifier according to embodiments of the present invention.

As shown in FIG. 2, in a typical premises such as a subscriber residence, a single coaxial cable 206 will extend from the service provider network 202 to the subscriber premises 204. The coaxial cable 206 will connect to the RF input port of a signal amplifier 210. The signal amplifier 210 can be nearly identical to the signal amplifier 100 discussed above with reference to FIG. 1, except that the power divider network 220 of signal amplifier 210 has three directional couplers 221-223 that connect to four RF output ports 231-234 while the power divider network 170 of signal amplifier 100 has seven directional couplers 171-177 that connect to eight RF output ports 181-188. The power divider network 220 is positioned at the output of the active communications path 212 through RF signal amplifier 210. The signal amplifier 210 further includes a passive communications path 214 that is connected to a passive RF output port 235. The signal amplifier 210 further includes a MoCA rejection filter 216 that is coupled between the active communications path 212 and the power divider network 220 and a MoCA diplexer 218 that is coupled between the passive RF output port 235, the passive communications path 214 and a node 219 that is between the MoCA rejection filter 216 and the power divider network 220.

Coaxial cables 241-245 connect each RF output port 231-235 to a respective wall jack 251-255. End devices 271-275 such as television sets, set-top boxes, cable modems, VoIP telephones and the like may be connected to wall jacks 251-255 by respective coaxial patch cords 261-265.

As noted above, MoCA communications refer to communications that are transmitted within a subscriber premises between the various wall jacks throughout the premises using the coaxial cable that is installed throughout the premises as a communications network. For example, referring to FIG. 2, set-top box 271 may transmit programming such as a television show to a television 275 using the coaxial patch cords 261-265, the wall jacks 251-255 the coaxial cables 241-245 and the signal amplifier 210 as an in-premises communications network 200. Set-top box 271 (or another end device that is connected in series with set-top box 271 that receives the programming from set-top box 271) will transmit the programming as a reverse path signal in the MoCA frequency band (e.g., 1150MHz to 1675 MHz). This MoCA signal travels over the patch cord 261, through the wall jack 251, over coaxial cable 241 to RF output port 231 of signal amplifier 210. The MoCA signal then travels in the reverse path direction through each directional coupler 221-223 in the power divider network 220 of signal amplifier 210. At each directional coupler 221-223 in the power divider network 220, some of the MoCA signal energy that flows into an output leg of the directional coupler 221-223 will pass to the input port of the directional coupler 221-223, while the remainder of the MoCA signal energy will pass to the other output leg of the directional coupler 221-223 as a forward path signal. In this manner, the MoCA signal energy is spread throughout the power divider network 220, and the MoCA signal will be present at each RF output port 231-234 that is connected to the power divider network 220.

Some of the MoCA signal energy from end device 271 will pass from the output port to the input port of directional coupler 222 and then from the output port to the input port of directional coupler 221 to arrive at node 219. At node 219, the MoCA rejection filter 216 will block the MoCA signal from flowing in the reverse path onto the active communication path 212. As noted above, MoCA rejection filter 216 may be reflective with respect to signals in the MoCA frequency band, and hence may reflect most of the MoCA signal back into the forward path direction. This reflected MoCA signal will split, with some of the MoCA signal energy flowing into the input port of directional coupler 221 where it is then divided by the directional couplers 221-223 and passed in the forward direction to the RF output ports 231-234, while the remainder of the MoCA signal energy flows to the high frequency (MoCA) port of the MoCA diplexer 218. The MoCA signal energy input to the MoCA diplexer 218 will travel through the common port of the MoCA diplexer 218 to the passive RF output port 235.

Thus, as shown in FIG. 2, the MoCA rejection filter 216, the MoCA diplexer 218, the power divider network 220 and the RF output ports 231-235 of signal amplifier 210, along with the coaxial cabling 241-245, 261-265 and wall jacks 251-255 in the subscriber premises 204 form an in-premises communications network 200 for the transmission of signals in the MoCA frequency band between end devices 271-275 in the subscriber premises 204.

As is known to those of skill in the art, directional couplers are typically designed to provide a high degree of isolation between their output legs such as, for example, at least 25 dB of isolation in the frequency band of interest. This isolation may help ensure, for example, that a signal transmitted in the reverse direction (i.e., from an output leg to the input of the directional coupler) does not interfere with data transmissions on the other output leg of the directional coupler. The high degree of isolation between the output legs also is important because one of the output legs of a directional coupler may be left un-terminated within a subscriber premises (i.e., the output leg connects to a wall jack that does not have an end device connected thereto), and hence the high degree of isolation between the output legs may reduce the impact that the unmatched termination on the unterminated output leg may have on signals flowing through the other output leg of the directional coupler.

This high degree of isolation, however, may significantly attenuate MoCA signals that are transmitted between the output ports 231-235 of signal amplifier 210. Thus, in some embodiments, some or all of the directional couplers 221-223 may be designed to include MoCA bypass circuits between their output legs so that the MoCA signals will exhibit reduced attenuation when traversing the power divider network 220.

Figure 3:
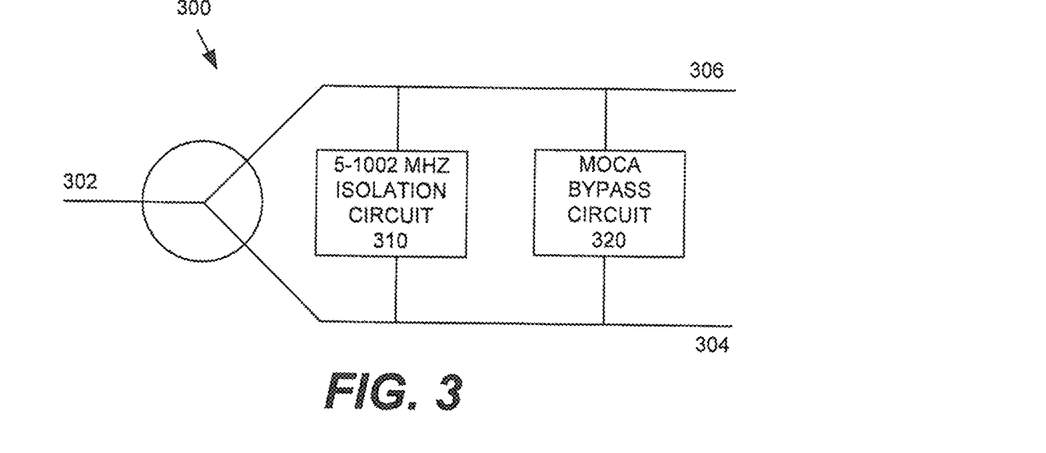
FIG. 3 is a schematic diagram of a directional coupler that includes a MoCA bypass circuit according to embodiments of the present invention.

FIG. 3 is a schematic diagram of a directional coupler 300 that includes a MoCA bypass circuit according to embodiments of the present invention. The directional coupler 300 of FIG. 3 may be used, for example, as one or more of the directional couplers 221-223 in FIG. 2 or as one or more of the directional couplers 171-177 in FIG. 1. As shown in FIG. 3, the directional coupler 300 has an input 302 and first and second output legs 304, 306. The directional coupler 300 further includes an isolation circuit 310 and a MoCA bypass circuit 320.

The isolation circuit 310 is configured to provide a high degree of isolation between the first output 304 and the second output 306 in the standard cable television network operating band (i.e., between about 5 MHz and about 1002 MHz). By way of example, the isolation circuit 310 may be designed to provide at least 25 dB of isolation between the outputs 304, 306 of the directional coupler 300 in the 5-1002 MHz frequency band. In some embodiments, the isolation circuit 310 and the directional coupler 300 may be implemented as a single circuit. In other embodiments, the isolation circuit 310 and the directional coupler 300 may be implemented as separate circuits.

The MoCA bypass circuit 320 is designed to pass signals in at least the 1150 MHz to 1675 MHz MoCA frequency band between the first output 304 and the second output 306. In some embodiments, the MoCA bypass circuit 320 may comprise a MoCA bandpass or high pass filter circuit 320. It will be appreciated that a bypass circuit such as circuit 320 will typically have some level of loss associated with it, such as a loss of, for example, 2-10 dB. However, this loss is a small fraction of the attenuation provided by the isolation circuit 310 (which loss typically exceeds 25 dB), and hence the MoCA bypass circuit is considered to "pass" signals in the 1150 MHz to 1675 MHz MoCA frequency band, while the isolation circuit 310 is considered to "block" signals in the standard cable television network operating band. In some embodiments, the MoCA bypass circuit 320 and the directional coupler 300 may be implemented as a single circuit. In other embodiments, the MoCA bypass circuit 320 and the directional coupler 300 may be implemented as separate circuits. It will also be appreciated that the MoCA bypass circuit 320 and the isolation circuit 310 may be implemented as a single circuit (which circuit may or may not be part of the directional coupler 300).

Figure 4:
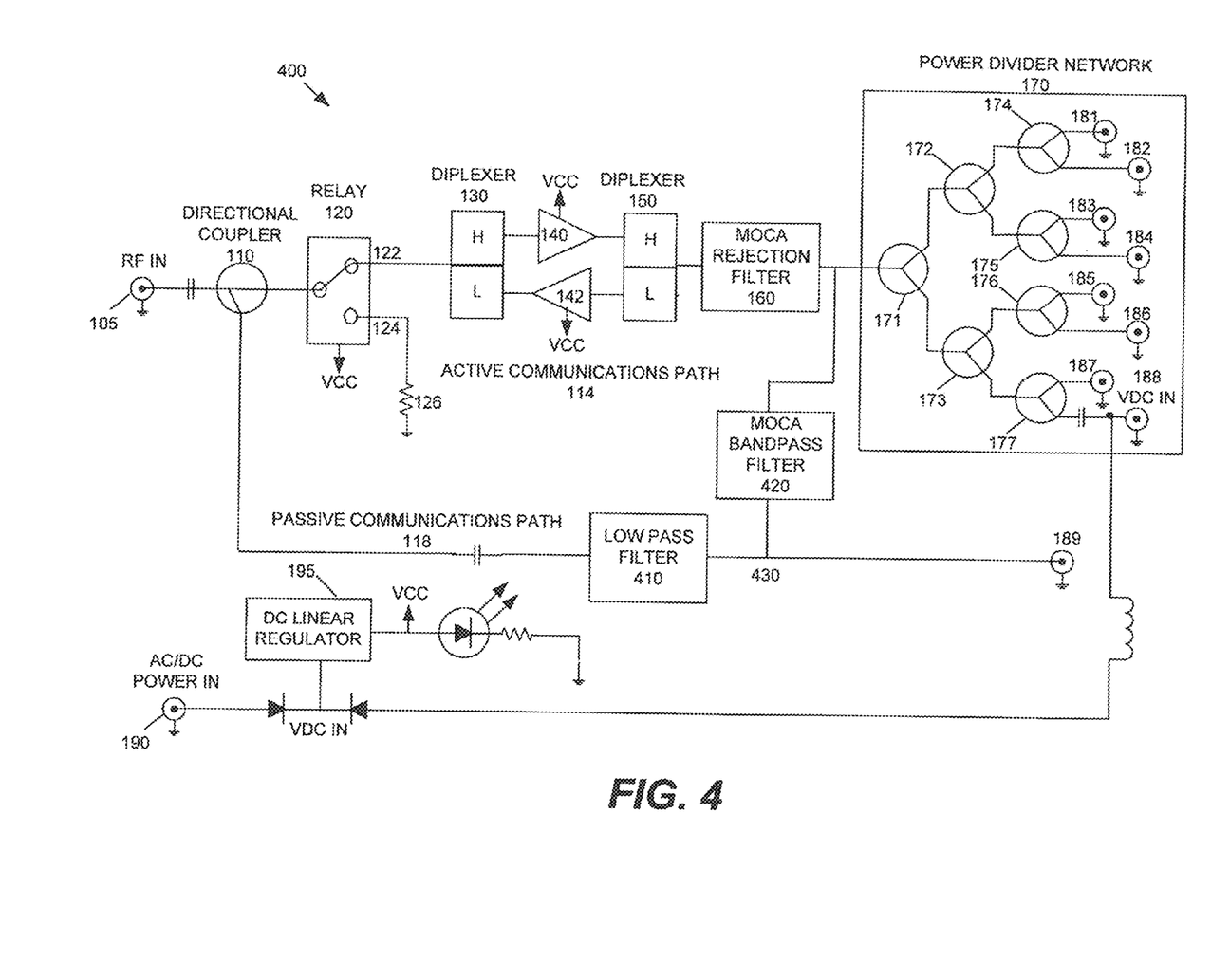
FIG. 4 is a block diagram of a bi-directional RF signal amplifier for a cable television network that is capable of supporting MoCA communications according to further embodiments of the present invention.

FIG. 4 is a block diagram of a bi-directional RF signal amplifier 400 according to further embodiments of the present invention. The RF signal amplifier 400 is very similar to the RF signal amplifier 100 that is discussed above. Accordingly, the discussion below will only focus on the elements of RF signal amplifier 400 that differ from the design of RF signal amplifier 100.

As can be seen by comparing FIGS. 1 and 4, the MoCA diplexer 162 of RF signal amplifier 100 is replaced with a low pass filter 410 and a MoCA bandpass filter 420 in the RF signal amplifier 400. The low pass filter 410 may comprise, for example, a filter that is configured to pass signals in the 0-1002 MHz frequency range (i.e., the forward path and reverse path cable television signals). In other embodiments, a bandpass filter may be used instead of a low pass filter where the bandpass filter is configured to pass signals in, for example, the 5-1002 MHz frequency range. The filter 410 may comprise a two port device having a first port that is coupled to the second output of directional coupler 110 and a second port that is connected to a node 430 that connects to the passive output port 189.

The MoCA bandpass filter 420 may comprise, for example, a filter that is configured to pass signals in the 1125-1675 MHz frequency range, although other frequency ranges may be selected (e.g., 1125-1550 MHz). The MoCA bandpass filter 420 may comprise a two port device having a first port that is coupled to a node that is between the MoCA rejection filter 160 and the input to the power divider network 170, and a second port that is connected to the node 430 that connects to the passive output port 189.

The combination of the low pass filter 410 and the MoCA bandpass filter 420 may operate similarly to the MoCA diplexer 162 in the RF signal amplifier of FIG. 1. In particular, the MoCA bandpass filter 420 may allow MoCA signals that travel in the reverse path through the power divider network 170, specifically including reverse path MoCA signals that are reflected by the MoCA rejection filter 160, to pass to the node 430. At the node 430, the low pass filter 410 blocks the MoCA signals from travelling toward the directional coupler 110, thereby directing these MoCA signals to the output port 189. The low pass filter 410 allows forward and reverse path cable television signals to pass between the input port 105 and the output port 189. The MoCA bandpass filter 420 blocks forward and reverse path cable television signals on the passive communications path 118 from travelling to the power divider network 170. If the MoCA bandpass filter 420 is configured to have reflective properties, this may help maintain the power levels, and hence the signal quality, of the cable television signals transmitted over the passive communications path 118.

Like the RF signal amplifier 100 discussed above, the RF signal amplifier 400 supports MoCA communications that are passed from one of the RF output ports 180-189 to other of the RF output ports 180-189. Notably, MoCA communications are not only supported between the active RF output ports 180-188, but are also supported between the active RF output ports 180-188 and the passive RF output port 189.

The use of the low pass filter 410 and the MoCA bandpass filter 420 in place of the MoCA diplexer 162 may have certain advantages. In particular, diplexers typically need to be tuned on an individual basis, and such tuning can result in increased manufacturing costs. In contrast, the low pass filter 410 and MoCA bandpass filter 420 need only be designed to have the correct output impedances (e.g., 75 ohms) to properly operate together. Thus, the use of individual filters may reduce manufacturing costs. Additionally, diplexers are typically implemented as a low pass filter and a high pass filter. High pass filters generally pass signals at all frequencies above a specified cut-off frequency. This can allow noise signals at higher frequencies (e.g., above the MoCA band) to pass through the network. To the extent that there are non-linear elements in the network (e.g., amplifiers), these noise signals may generate harmonics that may appear as noise within the frequency bands of interest (e.g., the cable television frequency band and the MoCA frequency band). Thus, the use of a bandpass filter 420 in the embodiment of FIG. 4 may also provide improved performance in some situations. However, it will be appreciated that a high pass filter may be used in place of the MOCA bandpass filter 420 in some embodiments.

In some embodiments, one or both of the low pass filter 410 and the MoCA bandpass filter 420 may be implemented using integrated circuit chip filters that are pre-tuned at the time of manufacture.

Figure 5:
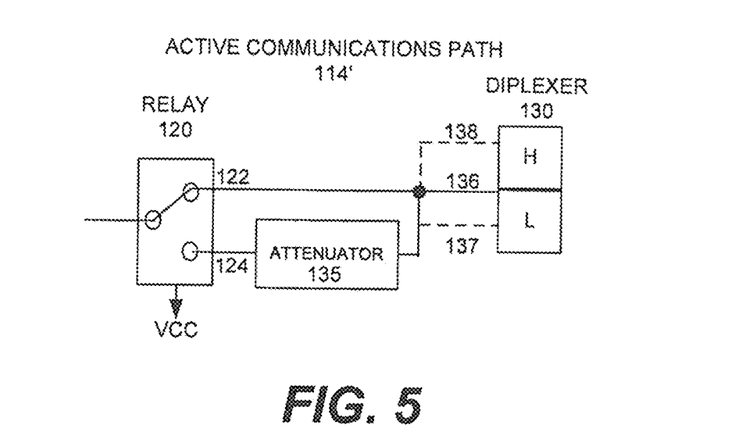
FIG. 5 is a block diagram of a portion of the active path for a bi-directional RF signal amplifier for a cable television network according to still further embodiments of the present invention.

FIG. 5 is a block diagram of a portion of the active communications path 114' of a bi-directional RF signal amplifier according to further embodiments of the present invention. In particular, FIG. 5 illustrates an alternative active communications path 114' design that may be used, for example, in either the RF signal amplifier 100 of FIG. 1 or the RF signal amplifier 400 of FIG. 4 to provide additional embodiments. As shown in FIG. 5, the design of the RF signal amplifiers 100 and 400 may be modified to replace the matched termination resistor 126 that is connected to the second output 124 of relay 120 with an attenuator 135. The output of the attenuator 135 is connected to the common port of the first diplexer 130 via an electrical connection 136. When the power supply to RF signal amplifier is interrupted, the relay 120 senses the interruption and automatically switches from the "through" position to the "attenuated" position, thereby placing the attenuator 135 in series between the relay 120 and the diplexer 130. The attenuator 135 may exhibit an impedance that is relatively close to 75 ohms, and hence the first output 112 of the directional coupler 110 will see an impedance of approximately 75 ohms. As such, signal degradation due to reflections and the like can be reduced in order to provide acceptable signal quality on the passive communications path 118 during power outages. Thus, the relay 120 may be used to route signals that are carried on the active communications path 114' over either a "through" branch of the active communications path 114 that passes directly from the relay 120 to the diplexer 130, or instead may route the signals over an attenuated branch that passes from the relay 120, to the attenuator 135, and then to the diplexer 130 based on whether or not a power supply signal VCC is received at the relay 120. The use of attenuators to provide impedance matched terminations during power outages is discussed in U.S. patent application Ser. No. 13/761,369, filed Feb. 7, 2013, the entire content of which is incorporated herein in its entirety by reference.

As is also shown in FIG. 5, in other embodiments, the electrical connection 136 may be omitted and the output of the attenuator 135 may be connected by an electrical connection 137 to the circuitry used to implement the "low" side of diplexer 130 or by an electrical connection 138 to the circuitry used to implement the "high" side of diplexer 130. Example configurations of each of these designs are disclosed in aforementioned U.S. patent application Ser. No. 13/761,369. It will be appreciated that the MOCA-enabled RF amplifier designs disclosed herein may be modified to incorporate the designs for the active and passive communications paths that are disclosed in aforementioned U.S. patent application Ser. No. 13/761,369.

Figure 6:
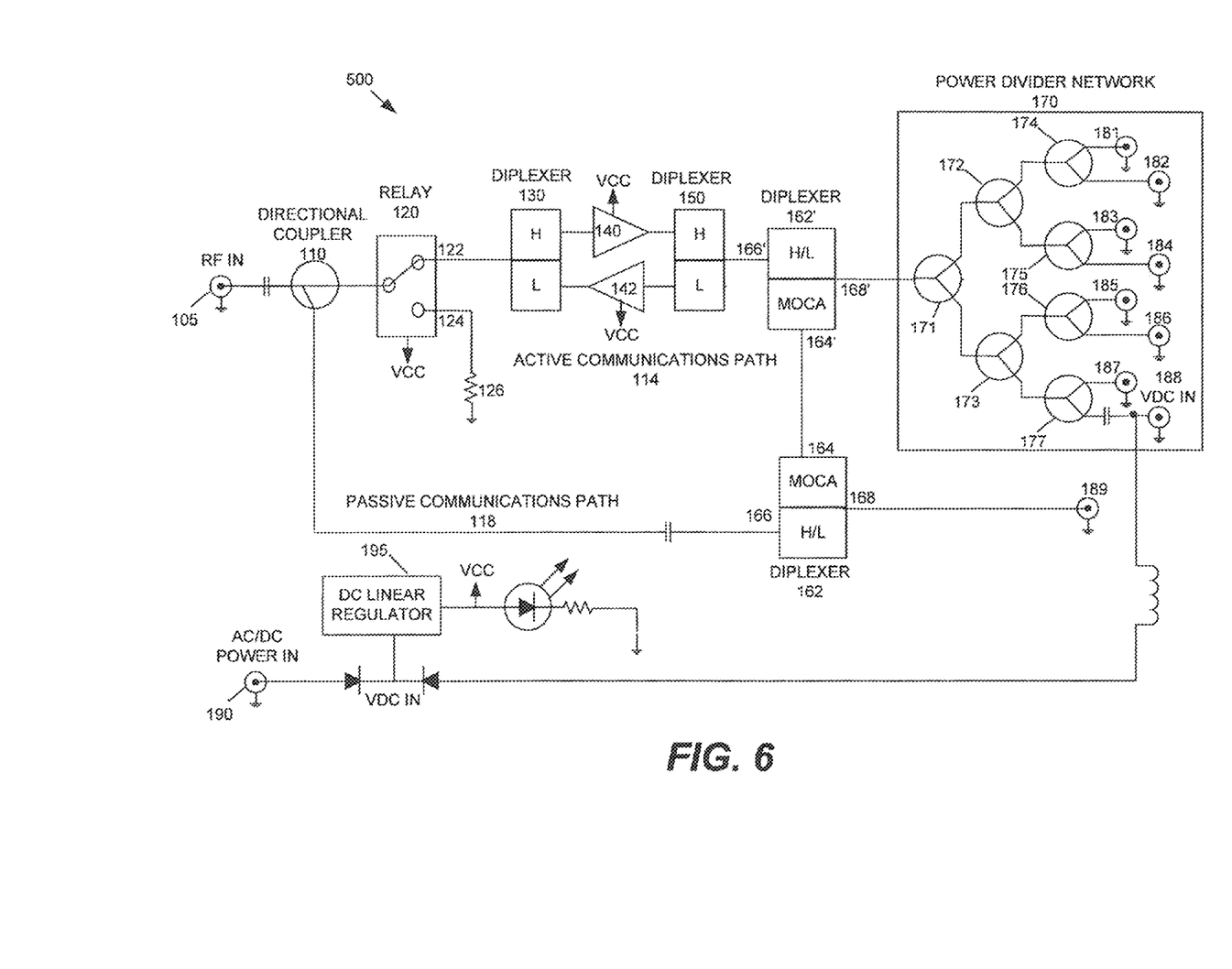
FIG. 6 is a block diagram of a bi-directional RF signal amplifier for a cable television network that is capable of supporting MoCA communications according to yet additional embodiments of the present invention.

FIG. 6 is a block diagram of a bi-directional RF signal amplifier 590 that is capable of supporting MoCA communications according to still further embodiments of the present invention. As is readily apparent, the bi-directional RF signal amplifier 500 is very similar to the bi-directional RF signal amplifier 100 of FIG. 1 that is discussed above, except that in the bi-directional RF signal amplifier 500 the MOCA rejection filter 160 of FIG. 1 is replaced with a second MOCA diplexer 162'. The second MOCA diplexer 162' may be identical to the first MOCA diplexer 162, and both may be implemented as integrated circuit chips. The H/L side of the MOCA diplexer 162' may be implemented, for example, as a low pass filter with a cutoff frequency of about 1 GHz or as a MOCA rejection filter that rejects signals in the MOCA bandwidth (e.g., in the 1150 MHz to 1675 MHz frequency band). The MOCA side of the MOCA diplexer 162' may be implemented, for example, as a high pass filter with a cutoff frequency of about 1150 MHz or as a MOCA passing filter that passes signals in the MOCA bandwidth (e.g., in the 1150 MHz to 1675 MHz frequency band) while blocking signals in the 5 MHz to 1002 MHz CATV bandwidth.

As shown in FIG. 6, the common output of the downstream diplexer 150 is fed to the H/L input of the MOCA diplexer 162'. Signals in the CATV bandwidth that are received from the downstream diplexer 150 are fed to the power divider network 170 via the common output of MOCA diplexer 162', and the filter in the MOCA side of the MOCA diplexer 162' blocks these CATV signals from passing to MOCA diplexer 162. CATV signals that flow in the reverse path pass from the power divider network 170 to the common port 168' of the MOCA diplexer 162' where they are passed to the H/L port 166' for transmission over the active communications path 114 to the RF input port 105. In contrast, MOCA signals that flow in the reverse path pass from the power divider network 170 to the common port 168' of the MOCA diplexer 162' are passed to the MOCA port 164' for transmission to the MOCA port 164 of MOCA diplexer 162, which routes such signals to the RF output port 189.

The present invention is not limited to the illustrated embodiments discussed above; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity. As used herein the expression "and/or" includes any and all combinations of one or more of the associated listed items.

It will be understood that when an element is referred to as being "coupled to" or "connected to" another element, it can be directly coupled or connected to the other element or intervening elements may also be present. In contrast, when an element is referred to as being "directly coupled to" or "directly connected to" another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise, it will be further understood that the terms "comprises", "comprising", "includes" and/or "including" when used in this specification, specify the presence of stated features, elements, and/or components, but do not preclude the presence or addition of one or more other features, elements, components, and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A radio frequency ("RF") signal amplifier, comprising:
   an RF input port;

a power divider network having a plurality of active RF output ports;
an active communications path connecting the RF input port to the power divider network, the active communications path including an upstream diplexer, a downstream diplexer and a power amplifier between the upstream diplexer and the downstream diplexer;
a passive RF output port;
a passive path diplexer that is coupled to the passive RF output port, wherein the passive path diplexer routes signals in a service provider network frequency band differently than signals in a second network frequency band, the service provider network frequency band being different than the second network frequency band;
a passive communications path connecting the RF input port to the passive path diplexer; and
a MoCA rejection filter between the power divider network and the active communications path.

2. The RF signal amplifier of claim 1, wherein the passive path diplexer comprises a MoCA diplexer, the RF signal amplifier further comprising an electrical connection between a high frequency port of the MoCA diplexer and a node between the MoCA rejection filter and the power divider network.

3. The RF signal amplifier of claim 2, wherein the electrical connection provides a communications path allowing MoCA signals to be transmitted from the plurality of active RF output ports to the passive RF output port.

4. The RF signal amplifier of claim 2, wherein a common port of the MoCA diplexer is coupled to the passive RF output port, and wherein a low frequency port of the MoCA diplexer is coupled to the passive communications path.

5. The RF signal amplifier of claim 4, wherein the MoCA rejection filter comprises a first integrated circuit MoCA rejection filter, and wherein the MoCA diplexer comprises a second integrated circuit MoCA rejection filter combined with a third integrated circuit filter that blocks signals in the 5 MHz to 1002 MHz frequency band.

6. The RF signal amplifier of claim 4, wherein the MoCA rejection filter blocks signals in at least the 1150 MHz to 1675 MHz frequency band.

7. The RF signal amplifier of claim 1, wherein the RF signal amplifier further comprises a power input for receiving electrical power, and wherein the active communications path further comprises a selective termination circuit that is configured to pass signals between the RF input port and the upstream diplexer when electrical power is received at the power input, and that is further configured to terminate the active communications path to a matched termination when an electrical power feed to the power input is interrupted.

8. The RF signal amplifier of claim 7, wherein the selective termination circuit comprises a relay having an input terminal, a first output terminal and a second output terminal, wherein the first output terminal of the relay is coupled to the upstream diplexer and the second output terminal of the relay is connected to a resistor that is terminated to a ground voltage, the RF signal amplifier further comprising a directional coupler having an input that is connected to the RF input port, a first output that is connected to the input terminal of the relay and a second output that is connected to the passive communications path.

9. The RF signal amplifier of claim 7, wherein the selective termination circuit comprises a switching device having an input terminal that is coupled to the RF input port, a first output terminal that is coupled to the upstream diplexer, and a second output terminal that is connected to an input of an attenuator, wherein an output of the attenuator is coupled to the upstream diplexer.

10. The RF signal amplifier of claim 1, wherein the power divider network comprises at least a first directional coupler that has an input port, first and second output ports and a MoCA bypass circuit coupled between the first and second output ports that is configured to pass signals in the 1150MHz to 1675 MHz frequency band, and an isolation circuit that is provided between the first and second output ports of the first directional coupler that is configured to block signals in the 5 MHz to 1002 MHz frequency band.

11. The RF signal amplifier of claim 1, wherein the MoCA rejection filter is configured to reflect a majority of the signal energy in the 1150 MHz to 1675 MHz frequency band.

12. The RF signal amplifier of claim 1, further comprising a printed circuit board, wherein the MoCA rejection filter comprises an integrated circuit chip that is pre-tuned to reject signals in the 1150 MHz to 1675 MHz frequency band, and wherein the integrated circuit chip is surface mounted on the printed circuit board.

13. A radio frequency ("RF") signal amplifier, comprising:
an RF input port;
a power divider network having a plurality of active RF output ports;
an active communications path connecting the RF input port to the power divider network, the active communications path including an upstream diplexer, a downstream diplexer and a power amplifier between the upstream diplexer and the downstream diplexer;
a first filter functioning as a MoCA rejection filter and coupled between the power divider network and the active communications path;
a passive RF output port;
a passive communications path connecting the RF input port to the passive RF output port;
a second filter coupled along the passive communications path between the RF input port and a first node that is connected to the passive RF output port, the second filter configured to pass signals in upstream and downstream frequency bands of a service provider;
a third filter coupled between the first node and a second node that is between the first filter and the power divider network, the third filter configured to pass signals in a MoCA frequency band and to not pass signals in the upstream and downstream frequency bands of the service provider.

14. An RF signal amplifier, comprising:
an RF input port;
a power divider network having a plurality of active RF output ports;
an active communications path connecting the RF input port to the power divider network, the active communications path including an upstream diplexer, a downstream diplexer and a power amplifier between the upstream diplexer and the downstream diplexer;
a passive RF output port;
a passive communications path connecting the RF input port to the passive RF output port;
a first filter functioning as a MoCA rejection filter and coupled between the power divider network and the active communications path;
a second filter coupled along the passive communications path between the RF input port and a first node that is connected to the passive RF output port, the second filter configured to pass signals in upstream and downstream frequency bands of a service provider;

an electrical connection between the first node and a second node that is between the first filter and the power divider network, the electrical connection providing a communications path allowing MoCA signals to be transmitted from the plurality of active RF output ports to the passive RF output port;

a third filter coupled along the electrical connection between the first node and the second node, the third filter configured to pass signals in a MoCA frequency band and to not pass signals in the upstream and downstream frequency bands of the service provider; and a power input for receiving electrical power, wherein the active communications path further comprises a selective termination circuit between the RF input port and the upstream diplexer, the selective termination circuit being configured to pass signals between the RF input port and the upstream diplexer when electrical power is received at the power input, and that is configured to terminate the active communications path to a matched termination when an electrical power feed to the power input is interrupted.

15. The RF signal amplifier of claim 14, wherein the first filter is configured to reflect a majority of the signal energy in the 1150 MHz to 1675 MHz frequency band.

16. The RF signal amplifier of claim 15, wherein the third filter comprises a high pass filter.

17. The RF signal amplifier of claim 14, wherein the selective termination circuit comprises a relay having an input terminal, a first output terminal and a second output terminal, wherein the first output terminal of the relay is coupled to the upstream diplexer and the second output terminal of the relay is connected to a resistor that is terminated to a ground voltage, the RF signal amplifier further comprising a directional coupler having an input that is connected to the RF input port, a first output that is connected to the input terminal of the relay and a second output that is connected to the passive communications path.

18. The RF signal amplifier of claim 14, wherein the selective termination circuit comprises a switching device having an input terminal that is coupled to the RF input port, a first output terminal that is coupled to the upstream diplexer, and a second output terminal that is connected to an input of an attenuator, wherein an output of the attenuator is coupled to the upstream diplexer.

19. The RF signal amplifier of claim 14, wherein the power divider network comprises at least a first directional coupler that has an input port, first and second output ports and a MoCA bypass circuit coupled between the first and second output ports that is configured to pass signals in the 1150MHz to 1675 MHz frequency band, and an isolation circuit that is provided between the first and second output ports of the directional coupler that is configured to block signals in the 5 MHz to 1002 MHz frequency band.

20. The RF signal amplifier of claim 14, further comprising a printed circuit board, wherein the first MoCA rejection filter comprises an integrated circuit chip that is pre-tuned to reject signals in the MoCA frequency band, and wherein the integrated circuit chip is surface mounted on the printed circuit board.

21. A radio frequency ("RF") signal amplifier, comprising:
- an RF input port;
- a power divider network having a plurality of active RF output ports;
- an active communications path connecting the RF input port to the power divider network, the active communications path including an upstream diplexer, a downstream diplexer and a power amplifier between the upstream diplexer and the downstream diplexer;
- a passive RF output port;
- a passive path diplexer that is coupled to the passive RF output port, wherein the passive path diplexer routes signals in a service provider network frequency band differently than signals in a second network frequency band, the service provider network frequency band being different than the second network frequency band;
- a passive communications path connecting the RF input port to the passive path diplexer; and
- an active path diplexer that is coupled to the downstream diplexer, wherein the active path diplexer routes signals in the service provider network frequency band differently than signals in the second network frequency band.

* * * * *